(12) United States Patent
Hamada et al.

(10) Patent No.: US 6,255,382 B1
(45) Date of Patent: *Jul. 3, 2001

(54) COATED GOLF BALL

(75) Inventors: Akihiko Hamada, Kakogawa;
Kuniyasu Horiuchi, Kobe, both of (JP)

(73) Assignee: Sumitomo Rubber Industries, Ltd., Hyogo-ken (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/958,855

(22) Filed: Oct. 27, 1997

Related U.S. Application Data

(63) Continuation of application No. 08/525,188, filed on Sep. 8, 1995, now abandoned.

(30) Foreign Application Priority Data

Sep. 9, 1994 (JP) .................................................. 6-215774

(51) Int. Cl.⁷ ........................... C09D 175/04; A63B 37/14
(52) U.S. Cl. ........................... 524/591; 525/454; 473/351; 473/356; 473/376; 473/378

(58) Field of Search .................................. 473/351, 378, 473/356, 376; 525/591; 524/454

(56) References Cited

U.S. PATENT DOCUMENTS

| | | | | |
|---|---|---|---|---|
| 4,871,589 | * | 10/1989 | Kitaoh et al. | 427/322 |
| 4,966,948 | * | 10/1990 | Godbe, Jr. et al. | 525/453 |
| 5,104,928 | * | 4/1992 | Craun et al. | 524/839 |
| 5,169,888 | * | 12/1992 | Sales | 524/506 |
| 5,300,325 | * | 4/1994 | Nealon et al. | 427/379 |
| 5,459,220 | * | 10/1995 | Kennedy | 528/44 |

\* cited by examiner

*Primary Examiner*—David J. Buttner
(74) *Attorney, Agent, or Firm*—Birch, Stewart, Kolasch & Birch, LLP

(57) ABSTRACT

The present invention provides a coated golf ball with excellent adhesion between the paint and the golf ball cover as well as superb durability. A coated golf ball comprises a golf ball body and a paint layer formed thereon, wherein the paint layer is formed from a carboxyl group-containing water dispersed polyurethane paint which is crosslinked by a carbodiimide compound.

13 Claims, No Drawings

COATED GOLF BALL

This application is a continuation of application Ser. No. 08/525,188 filed Sep. 8, 1995, now abandoned.

DEFINITION OF TERMS

The term "coated golf ball" means a golf ball body which is coated with paint. Accordingly, one which is generally called "golf ball" by consumers and commercially available belongs to the "coated golf ball". In the present specification, the term "golf ball" may sometimes Indicate the "coated golf ball" according to the common usage.

The term "golf ball body" means a golf ball before coating with paint.

FIELD OF THE INVENTION

The present invention relates to a coated golf ball comprising a golf ball body and a paint layer formed thereon. More particularly, it relates to a coated golf ball having excellent adhesion between the paint and the cover and improved paint durability.

BACKGROUND OF THE INVENTION

Golf balls are generally coated with paint In order to look beautiful or to prevent damage to the ball surface. The paint layer is composed of an enamel paint containing pigments such as titanium oxide, etc., and a clear paint containing no pigments, formed on the enamel paint, or a clear paint only.

Hitherto, an organic solvent based two-package reaction type urethane paint has been used for the paint for golf balls. Also, an epoxy paint is often used as primer. The use of the conventional paint has problems in safety and working environment, because an organic solvent is used.

On the other hand, in recent years, so-called non-enamel golf balls, coated only with clear paint, tend to gain popularity for the reason of good luster and tone. However, they have a defect to deteriorate the golf ball cover surface and to reduce adhesion between the cover and the paint, because sun light penetrates through the paint layer and directly irradiates the cover when non-enamel golf ball is exposed outdoors. Consequently, it is required more than ever to improve the adhesion between the paint and the cover.

To solve the above two problems, that is, to eliminate the use of organic solvents and to improve the adhesion between the paint and the golf ball cover, a water dispersed urethane paint has been proposed in Japanese Patent Kokoku Publication Hei-2(1990)-11095. The paint proposed in the Utility Model Publication solves problems associated with the use of organic solvents and improves the adhesion between the golf ball cover and the paint layer, to some extent. It is, however, desired to further improve adhesion, durability and strength of the paint layer. Also, the paint of the Utility Model Publication employs polyfunctional ethyleneimine (aziridine) compounds as crosslinking agents, which, however, are effective for solving the problems to some extent but not satisfactorily. Further the ethyleneimine is a substance having mutagenicity and is limited in use.

SUMMARY OF THE INVENTION

In order to solve the above mentioned problems and to obtain golf balls which have a coating layer having further Improved adhesion between the golf ball cover and the paint layer, having good toughness and good durability, the present inventors have been actively involved in the investigation, and finally, found that golf balls which use carboxyl group-containing water dispersed polyurethane paint for at least the primer layer of the paint layer which is crosslinked with carbodiimide compounds can provide excellent adhesion and durability superior to the conventional golf balls.

Accordingly, the present invention provides a coated golf ball which comprises a golf ball body and a paint layer formed thereon, wherein the paint layer is formed from a carboxyl group-containing water dispersed polyurethane paint which is crosslinked by a carbodiimide compound.

DETAILED DESCRIPTION OF THE INVENTION

The carboxyl group-containing water dispersed polyurethane paint to be used in the present invention can be manufactured by the known techniques disclosed, for example, in Japanese Kokoku Publication Sho 43-9076, Japanese Kokai Publication Sho 61-36314 and the like. That Is, a linear polyurethane is primarily synthesized from a polyhydroxyl compound, a polyisocyanate, a chain extender having active hydrogen by art known methods. In order to introduce carboxyl group in the polyurethane, If the polyurethane has an isocyanate group (—N=C=O), a compound having both active hydrogen having reactivity with isocyanate carboxyl group are allowed to react in a solution of an organic solvent, for example, acetone, etc. to introduce a carboxyl group. If the polyurethane has a hydroxyl group, a compound having both an isocyanate group and carboxyl group are allowed to react in a solution of an organic solvent, for example, acetone, etc. to introduce a carboxyl group. The carboxyl group is neutralized with ammonia or amines, and after adding water to it, the organic solvent is removed to obtain the desired carboxyl group-containing water dispersed polyurethane paint. In the above case, the preferred polyisocyanate Is a non-yellowing aliphatic or alicyclic polyisocyanate In view of weatherability.

The carboxyl group-containing water dispersed polyurethane paint is commercially available as SUNCURE 776, SUNCURE 895, SUNCURE 11447, SUNCURE 847, SUNCURE 898, etc. from Sanker Company in U.S.A., as U-COAT UWS-140 from Sanyo Chemical Industries, Ltd., as SPENSOL-L53, SPENSOL L-54, SPENSOL L-55, SPENSOL L-56, etc. from Dainippon Ink & Chemicals, Inc., which can be suitably used independently or in combination. All of the commercially available paint are transparent paints containing 25 to 35% by weight of a polyurethane resin colloidally dispersed in water, % by weight being based on the solid content of the paint.

The carbodiimide compounds which are used for the crosslinking agent of the water dispersed polyurethane paint have the following chemical formula.

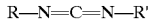

(R and R' independently show an alkyl group)

The carbodiimide compound exhibits extremely strong reactivity with free carboxyl groups and reacts with carboxyl groups to form N-acylurea. This reaction is conducted as low as about 30–60° C. to crosslink polyurethane. However, since carboxyl groups form salts and are ionized in the water-based paint, the crosslinking reaction scarcely takes place and the carbodiimide compound ensures a long pot life and is stable. Examples of the carbodiimide compounds used in the present invention are N,N'-dicyclohexylcarbodiimide, 1-ethyl-3-(3'-dimethylaminopropyl)carbodiimide, and the like. The carbodiimide compound is also commercially available from Union Carbide Corp., USA as UCARLNK XL-25SE and UCARLNK XL-29SE, which can also be suitably used.

An amount of the carbodiimide compound of the present invention to be added to the water dispersed polyurethane paint is preferably 0.5–10 parts by weight, more suitably 1.0–8 parts by weight to 100 parts by weight of the paint. If it is less than 0.5 parts by weight, the effects of addition are poor and if it Is more than 10 parts by weight, crosslinking excessively takes place and durability (crack resistance) lowers.

The carboxyl group-containing water dispersed polyurethane paint according to the present invention may contain a leveling agent such as Zonyl FSO available from du Pont, Aerosol OTS available from American Cyanamide Company and the like, an antifoamer such as Foamaster VL available from Henkel Diamond Shamrock and the like, a thixotropy provider RM825 available from Rohm & Haas and the like, and other surface modifying agents, etc. And an aqueous dispersion of a colorant, particularly, a white pigment such as titanium oxide, etc. is added to be used as an enamel paint. An amount of the pigment may be suitably added by 40–60% by weight, preferably 50 to 55 by weight, based on the solid content of the paint. If the pigment Is less than 40% by weight, film shielding effects Is poor. If it exceeds 60% by weight, film physical properties is poor. In the case of a clear paint, the colorant is not basically contained.

The paint may further contain various additives or diluents, etc. in addition to the above-mentioned components. Examples of additives include a ultraviolet inhibitor, photostabilizer, filler pigment, and fluorescence material or fluorescence brightener An amount of the additives is 0.1–10% by weight based on the solid content of the paint.

The fluorescence material or fluorescence brightener to be formulated in the paint can be those commonly known and used in golf balls. Specific examples are 2,5-bis[5'-t-butylbenzoxyazoryl(2)]thlophene (commercially available from Japan Ciba-Geigy Co. as YUBITEX OB), 7-(2h-naphthol(1,2-d)-triazole-2-Y1)-3-phenyl-cusline (commercially available from Sadoz Company as Leucopure EGM), etc., which are preferable, and a biazoline derivative (commercially available from Mobey Chemical Corporation as Phorwhite K-2002), oxazole-based agents (commercially available from Sumitomo Chemical Industries Co. as Whitefuller HCS, PCS, and B, and Hostalux KCB from Hechist Japan Co.). An amount of these agents may be 0.005–1.0% by weight based on the solid content of the paint.

The diluents formulated In the paint include water and alcohol such as methanol, ethanol and isopropyl alcohol, etc. An amount of diluents is not partcularly limited, but preferably 5 to 50% by weight.

According to the present Invention, the water dispersed polyurethane paint prepared as above is applied to golf ball bodies as a primer layer. The application method is not limited but includes air gun coating or electrostatic coating.

The surface of the golf ball body, to which the primer layer according to the present invention is applied, can be any of Ionomer cover, balata cover, hard rubber and the like. Particularly, Ionomer cover golf balls are best suited for excellent adhesion because the Ionomer itself contains free carboxyl groups. It is desirable from view point of excellent paint adhesion to carry out various surface treatments on the golf ball bodies, such as surface activation by oxidization, chlorination, etc. before applying the paint.

The structure of the paint layers of the present invention will be as follows. In multi-layer coating finish, the water dispersed polyurethane paint-carbodiimide crosslinking agent according to the present invention is used for the primer for the first layer, but to the second and the outer layers, various types of paint, such as conventional two-package solvent type polyurethane paint and the like can be used. Needless to say, all the layers can be formed from the paint according to the present invention. In one-layer coating finish, it is natural that the paint according to the present invention only is used.

The present invention provides golf balls with excellent adhesion between the paint and the golf ball cover and with outstanding coating durability.

EXAMPLES

The present invention will be described further in detail with reference to the following examples; however, these examples are not construed to limit the scope of the invention.

Examples 1 to 4 and Comparative Examples 1 to 3

A solid core having a diameter of 38.5-mm was prepared from polybutadiene rubber, zinc acrylate and peroxide. A cover material was prepared by mixing an ionomer resin (HI-MILAN#1605-to-HI-MILAN#1706 ratio=50 to 50 parts by weight) and 2 parts by weight of titanium oxide and then covered on the solid core by injection molding to obtain a golf ball body having a diameter of 42.8 mm. After conducting the surface treatment such as oxidation, etc. to the golf balls, the paints shown in Table 1 and Table 2 were applied by an air gun to control the film thickness of 10–15 $\mu$m. The coating of each layer was dried at 40° C. for 24 hours and marking was stamped on the primer coating, respectively.

Water Dispersed Paint

SUNCURE-776: available from Sanker Company, carboxyl group-containing water dispersed polyurethane paint (solid content: 35 wt %; viscosity: 100–200 cps; pH 9–10; 100% modulus: 80 kgf/cm$^2$)

SUNCURE-11447: available from Sanker Company, carboxyl group-containing water dispersed polyurethane paint (solid content: 30 wt %; viscosity: 50 cps; pH 9–10; 100% modulus: 420 kgf/cm$^2$)

SPENSOL L-54: available from Dainippon Ink & Chemicals, Inc., carboxyl group-containing water dispersed polyurethane paint (solid content: 32 wt %; viscosity: 1000 cps; pH 7.5–9.0; 100% modulus: 210 kgf/cm$^2$), and the 100% modulus indicates a dry coating film property.

Crosslinking Agent for Examples

UCARLNK XL-29SE: available from Union Carbide Co., polyfunctional carbodiimide [solid content (effective component): 50 wt % and dissolves in ethyl acetate].

Crosslinking Agent for Comparative Examples

XAMA-7: available from Virginia Chemical, polyfunctional aziridine (100% active; components: pentaeryhritol -Tris-($\beta$-aziridinil)proplonate).

Other Additives

Zonyl FSO: available from du Pont, paint leveling agent

After the obtained golf balls were stored at room temperature for 2 weeks, outdoor exposure test, then, adhesion test, abrasion-resistance test, and crack-resistance test were carried out in that order. The results were shown likewise in Table 1 and Table 2.

TABLE 1

| Article name | | Example 1 | Example 2 | Example 3 | Example 4 |
|---|---|---|---|---|---|
| Composition of first primer paint | SUNCURE 776 | 70 | 70 | 70 | — |
| | SUNCURE 11447 | 30 | 30 | 30 | — |
| | SPENSOL L54 | — | — | — | 100 |
| | UCARLNK 29SE | 4.0 | 6.0 | 4.0 | 4.0 |
| | XAMA-7 | — | — | — | — |
| | Zonyl FSO | 0.1 | 0.1 | 0.1 | 0.1 |
| | Demineralized water | 10 | 10 | 10 | 20 |
| Composition of top clear paint | SUNCURE 776 | 20 | 20 | | |
| | SUNCURE 11447 | 80 | 80 | | |
| | UCARLNK 29SE | 4.0 | 4.0 | *1 | *1 |
| | Zonyl FSO | 0.1 | 0.1 | | |
| | Demineralized water | 15 | 15 | | |
| Paint adhesion after outdoor exposure | Number of small squares remaining | 100/100 | 100/100 | 100/100 | 100/100 |
| | Judgment | Excellent | Excellent | Excellent | Excellent |
| Abrasion resistance | Abrasion rate (mg/one ball) | 8 | 7 | 9 | 8 |
| | Appearance after abrasion | Excellent | Excellent | Excellent | Excellent |
| Crack resistance | Appearance after hammering | Minor crack | Minor crack | Minor crack | Minor crack |
| | Judgment | Excellent | Excellent | Excellent | Excellent |

*1 Organic solvent based two-component reaction type polyurethane clear paint: Paint containing a polyester polyol resin having a hydroxyl group value of about 180 as a matrix.

TABLE 2

| Article name | | Comparative Example 1 | Comparative Example 2 | Comparative Example 3 |
|---|---|---|---|---|
| Composition of first primer paint | SUNCURE 776 | 70 | 70 | |
| | SUNCURE 11447 | 30 | 30 | |
| | SPENSOL L54 | — | — | *2 |
| | UCARLNK 29SE | — | — | |
| | XAMA-7 | — | 3.0 | |
| | Zonyl FSO | 0.1 | 0.1 | |
| | Demineralized water | 10 | 10 | |
| Composition of top clear paint | SUNCURE 776 | | | |
| | SUNCURE 11447 | | | |
| | UCARLNK 29SE | *1 | *1 | *1 |
| | Zonyl FSO | | | |
| | Demineralized water | | | |
| Paint adhesion after outdoor exposure | Number of small squares remaining | 50/100 | 60/100 | 20/100 |
| | Judgment | Good–Poor | Good–Poor | Poor |
| Abrasion resistance | Abrasion rate (mg/one golf ball) | 20 | 15 | 25 |
| | Appearance after abrasion | Good–Poor | Good | Poor |
| Crack resistance | Appearance after hammering | Minor crack | Small crack | Medium crack |
| | Judgment | Excellent | Good | Good–Poor |

*1 The same as mentioned above.
*2 Solvent based epoxy clear paint: Paint containing bisphenol A type epoxy resin (EPICOAT 1001 commercially available from Yuka Shell Co.) and a polyamide hardening agent.

Adhesion Test after Outdoor Exposure Test

After processing with the Weather-Ometer for 100 hours, the golf ball was allowed to collide with an impact plate 100 times at a speed of 45 m/sec and then, the crosscut adhesion test was carried out in accordance with JIS K-5400.

Abrasion Resistance Test

Five golf balls, 500 grams of sand for bunkers, and 1 liter of water were placed in a 3-L ball mill and milled for 1 hour, and the abrasion loss and the degree of damage to the surface were investigated. This investigation was carried out after the first coat was applied.

Crack Resistance Test

The ability of the paint film to resist crack generation was judged from the coating cracking condition when golf balls were allowed to collide with an impact plate 100 times at a speed of 45 m/sec.

As clear from Table 1 and Table 2, the golf ball according to the present invention exhibits excellent paint adhesion to the golf ball surface and provides a satisfactory level of durability including abrasion resistance and crack resistance of the paint.

What is claimed is:

1. A coated golf ball consisting essentially of a golf ball body and a paint layer formed thereon, wherein said paint layer consists essentially of a carboxyl group-containing water dispersed polyurethane paint which is crosslinked by a carbodiimide compound,
   wherein an amount of the carbodiimide compound to be added to the carboxyl group-containing water dispersed polyurethane paint is within the range of 0.5–10 parts by weight based on 100 parts by weight of the paint, and
   wherein the golf ball body consists essentially of a core and an ionomer resin cover formed on the core.

2. The coated golf ball according to claim 1, wherein said golf ball further consists essentially of an outer clear paint layer formed on the carboxyl group-containing water dispersed polyurethane paint layer.

3. The coated golf ball according to claim 1, wherein the paint layer contains pigment in an amount of 40–60% by weight based on the solid content of the paint.

4. The coated golf ball according to claim on 1, wherein the carboxyl group-containing water dispersed polyurethane paint contains 25 to 35% by weight of a polyurethane resin colloidally dispersed in water, the percentage by weight being based on the solid content of the paint.

5. The coated golf ball according to claim 1, wherein the carbodiimide compound is a compound having the following chemical formula

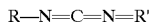

R—N=C=N—R' wherein R and R' are independently alkyl groups.

6. The coated golf ball according to claim 1, wherein the carbodiimide compound is N,N'-dicyclohexylcarbodiimide or 1-rthyl-3-(3'-dimethylaminopropyl)carbodiimide.

7. The coated golf ball according to claim 1, wherein an amount of the carbodiimide compound to be added to the carboxyl group-containing water dispersed polyurethane paint is within the range of 1.0–8 parts by weight on 100 parts by weight of the paint.

8. A coated golf ball comprising a golf ball body and only one paint layer formed thereon, wherein said one paint layer is formed from a carboxyl group-containing water dispersed polyurethane paint which is crosslinked by a carbodiimide compound, wherein an amount of the carbodiimide compound to be added to the carboxyl group-containing water dispersed polyurethane paint is within the range of 0.5–10 parts by weight based on 100 parts by weight of the paint, and wherein the golf ball body comprises a core and an ionomer resin cover formed on the core.

9. The coated golf ball according to claim 8, wherein the paint layer contains pigment in an amount of 40–60% by weight based on the solid content of the paint.

10. The coated golf ball according to claim on 8, wherein the carboxyl group-containing water dispersed polyurethane paint contains 25 to 35% by weight of a polyurethane resin colloidally dispersed in water, the percentage by weight being based on the solid content of the paint.

11. The coated golf ball according to claim 8, wherein the carbodiimide compound is a compound having the following chemical formula

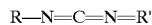

wherein R and R' are independently alkyl groups.

12. The coated golf ball according to claim 8, wherein the carbodiimide compound is N,N'-dicyclohexylcarbodimiide or 1-rthyl-3-(3'-dimethylaminopropyl) carbodiimide.

13. The coated golf ball according to claim 8, wherein an amount of the carbodiimide compound to be added to the carboxyl group-containing water dispersed polyurethane paint is within the range of 1.0–8 parts by weight on 100 parts by weight of the paint.

* * * * *